United States Patent [19]

Blum et al.

[11] 4,183,785

[45] Jan. 15, 1980

[54] METHOD FOR POSITIONING MODERATOR STRUCTURE FOR THE CORE OF A MOLTEN-SALT REACTOR

[75] Inventors: Jacques M. Blum, Levallois Perret; Edmond Ventre, Le Vesinet, both of France

[73] Assignee: Electricite de France (Service National) Pechiney Ugine-Kuhlmann, Paris, France

[21] Appl. No.: 871,998

[22] Filed: Jan. 24, 1978

Related U.S. Application Data

[62] Division of Ser. No. 697,153, Jun. 17, 1976, Pat. No. 4,102,740.

[30] Foreign Application Priority Data

Jun. 26, 1975 [FR]  France ............................. 75 20118
Oct. 9, 1975 [FR]  France ............................. 75 30981

[51] Int. Cl.² .......................................... G21C 5/00
[52] U.S. Cl. .................................. 176/84; 176/58 PB; 176/92 R
[58] Field of Search .............. 176/30, 33, 58 PB, 61, 176/84; 141/9–12

[56] References Cited

U.S. PATENT DOCUMENTS

| | | | |
|---|---|---|---|
| 3,039,945 | 6/1962 | Slack et al. | 176/33 X |
| 3,140,235 | 7/1964 | Hatch et al. | 176/58 PB X |
| 3,398,051 | 8/1968 | Seltorp | 176/58 PB X |
| 3,403,076 | 9/1968 | Bettis | 176/33 X |
| 4,082,608 | 4/1978 | Curet | 176/61 |

FOREIGN PATENT DOCUMENTS

| | | | |
|---|---|---|---|
| 633107 | 12/1961 | Canada | 176/58 PB |
| 641612 | 5/1962 | Canada | 176/58 PB |
| 1104627 | 4/1961 | Fed. Rep. of Germany | 176/58 PB |
| 2631408 | 1/1978 | Fed. Rep. of Germany | 176/58 PB |
| 1226423 | 8/1961 | France | 176/58 PB |
| 2296248 | 12/1974 | France | . |
| 822461 | 10/1959 | United Kingdom | 176/58 PB |
| 1135396 | 12/1968 | United Kingdom | 176/58 PB |

*Primary Examiner*—Peter A. Nelson
*Attorney, Agent, or Firm*—Cameron, Kerkam, Sutton, Stowell & Stowell

[57] ABSTRACT

The moderator structure is placed within a core space limited by a bottom wall, a top wall and a lateral reflector and is constituted by a stack of prismatic or spherical nodules applied in mutual contact in the three dimensions which prevent relative displacements of the nodules and so arranged as to form a lattice of interstices through which the molten salt is circulated.

16 Claims, 17 Drawing Figures

METHOD FOR POSITIONING MODERATOR STRUCTURE FOR THE CORE OF A MOLTEN-SALT REACTOR

This is a division, of application Ser. No. 697,153, filed June 17, 1976, now U.S. Pat. No. 4,102,740.

This invention relates to a moderator structure for the core of a molten-salt reactor.

It is known that in reactors of the molten-salt type, a salt containing fertile and fissile materials is circulated within the reactor core, this molten salt being therefore intended to perform the functions both of nuclear fuel and of primary fluid. In primary heat-exchangers, the molten salt exchanges its heat with a second fluid which again preferably consists of a salt. This second salt passes through a steam generator, the steam thus produced being finally caused to expand in an installation for the production or electric power. The molten fuel salts preferably consist of plutonium or uranium fluoride or else of a mixture of thorium or uranium fluoride dissolved in lithium and beryllium fluorides in order to obtain a mixture having a relatively low melting point, a suitable fluidity and a low vapor pressure.

The advantage of these reactors lies in the fact that they do not entail complicated refuelling operations since the fuel is provided in liquid form and not in the form of rods as in reactors of conventional types. Depending on the type of molten fuel employed and on the nature of the moderator which is stored in the reactor core region, these reactors are capable of operating with a thermal-energy neutron flux or a fast-neutron flux. This invention is concerned with the case of reactors which employ a thermal-energy neutron flux.

By reason of the fact that the fuel is in the liquid state, it is necessary to employ a moderator in the solid state in order to achieve the heterogeneity which is essential to good neutronic efficiency. This moderator is graphite which is employed in the form of moderator assemblies in conventional designs. In known reactors of this type, the moderator structure is constituted in most cases by elements having a length equal to the height of the reactor core.

The graphite which constitutes these moderator elements has low mechanical performances from the point of view of tensile strength and these performances are further impaired after irradiation since graphite undergoes a structural change which results in swelling after incipient shrinkage. In consequence, the moderator elements must be periodically withdrawn prior to swelling and excessive deformation since the existence of a gradient in the neutron field causes differential deformations in the moderator elements and results in bowing of these latter.

Handling of these elements is necessarily carried out by gripping the upper ends, with the result that the material works in tension.

Furthermore, bowing of these elements of substantial length gives rise to two major disadvantages:
- spontaneous crack formation under the action of internal stresses,
- jamming which occurs before a prohibitive value of swelling has been attained.

The present invention is precisely directed to a moderator structure and a method for handling said structure which overcome the disadvantages mentioned in the foregoing since the two following requirements are satisfied:
- maximum fractionation of the moderator in order to reduce bowing effects as far as possible,
- handling of the moderator elements without subjecting these latter to tensile stresses.

In accordance with the invention, the moderator structure for the core of a molten-salt reactor is essentially constituted within a space limited by a bottom wall, a top wall and a lateral reflector by a stack of separate nodules applied in mutual contact in the three dimensions which prevent relative displacements of said nodules and so arranged as to form a lattice of interstices through which the circulation of the molten salt takes place.

In accordance with a first embodiment, each nodule has the shape of a sphere and all the spheres have the same size.

In accordance with a second embodiment, the entire structure is formed by nodules having the shape of prismatic blocks having vertical lateral faces and a height in the vertical direction which is considerably smaller than the total height of the moderator structure.

Preferably, each nodule has a hexagonal cross-section and is provided with a plurality of vertical channels for the passage of the molten salts.

In accordance with a further characteristic feature of this embodiment, the structure is formed by an assembly of juxtaposed vertical columns, each column being constituted by a stack of nodules, the channels of nodules constituting any one column being located in the line of extension of each other.

In accordance with a third embodiment, the structure is distinguished by the fact that the reactor core comprises an inner core and a lateral outer core, that the inner core is constituted by columns obtained by stacking of prismatic nodules and that the lateral outer core is constituted by spherical nodules.

The present invention is also connected with a method for positioning and extracting the moderator structure a number of different alternative forms of the method being contemplated according to the type of moderator structure.

In the case of spherical nodules, the method essentially consists in feeding in bulk the quantity of spherical nodules required for filling the core region which is limited by a bottom wall, a top wall and a lateral reflector and in making use of hydraulic or pneumatic transfer means for the extraction operation.

Preferably, packing of the spherical nodules is perfected by subjecting the entire assembly to vibrations.

In the case of prismatic nodules, the entire moderator structure is first assembled on a temporary supporting rig outside the reactor and then introduced into said reactor, the different nodules constituting said structure being then disengaged from said supporting rig.

Preferably, said temporary supporting rig is constituted by a series of hollow rods on which are threaded the central channels of the columns of nodules, said hollow rods being rigidly fixed to a top support plate and each column of nodules being locked in position at its base on the corresponding hollow rod by means of a temporary locking member.

In this same case, the extraction of the moderator structure essentially consists in introducing in place of the fuel salt within the space which limits said structure a liquid having a higher density than that of the constituent material of the nodules in order to cause said nodules to float on said liquid and in extracting them from said liquid by means of a handling device designed to grip only the nodules aforesaid.

A more complete understanding of the invention will in any case be obtained from the following description of a number of embodiments of the invention which are given by way of example without any limitation being implied, reference being made to the accompanying drawings, wherein.

The neutron-moderating structure which forms the subject of the present invention is applicable to any thermal reactor of the molten-salt type. However, in the following description, reference will be made more especially to the molten-salt reactor which was described and claimed in French patent application No EN 74 42767 of Dec. 24th, 1974 filed in the name of Electricite de France and of Pechiney Ugine Kuhlmann. It is readily apparent that the reference made to this particular type of reactor does not have any limiting value and serves simply as a background illustration for the description given below.

Figure 1:
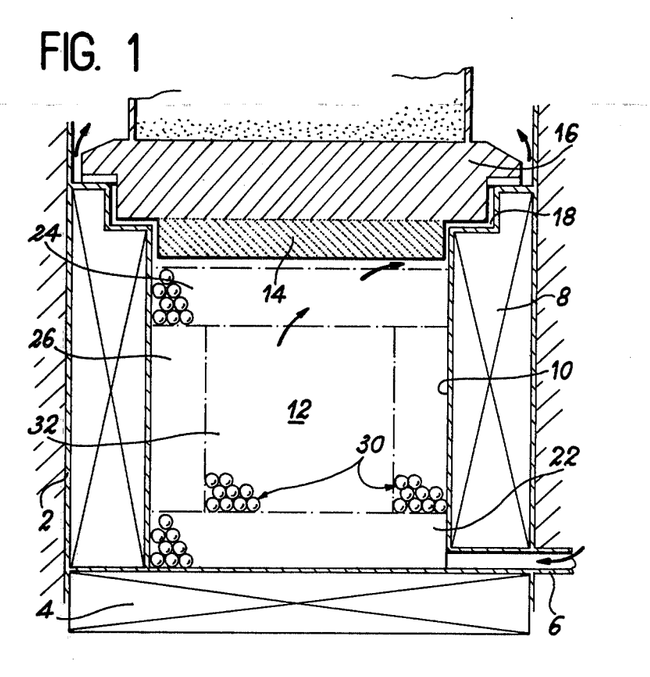
FIG. 1 is a vertical sectional view of the interior of a reactor having a moderator structure which is formed of spheres.

There is shown in FIG. 1 the core portion of a reactor of this type. The complete reactor is placed within an outer containment vessel which is not shown in the figure. Within the interior of said outer containment vessel, provision is made for a cylindrical vessel 2, the lower portion of which is closed by a reflector 4 provided with inlets 6 for the introduction of fuel salt. Within the interior of the cylindrical shell 2 and above the reflector 4, provision is made for a lateral reflector 8, the internal wall 10 of which defines the lateral limits of the core region 12 proper. Above the core region 12, there is shown a top reflector 14 fixed on a biological shield 16 which is in turn supported by the closure plug of the outer containment vessel of the reactor (not shown). Between the lateral reflector 8 and the top reflector 14, there is formed a narrow passage 18 through which the molten fuel is capable of escaping so as to pass towards the primary heat exchangers (not shown). The molten fuel is recycled in the core region 12 by pumps which return said fuel into the bottom core region through the inlets 6. The fuel circulates within the core region 12. In general, there can be distinguished within the core region a bottom outer core 22, a lateral outer core 26 having an annular shape, a top outer core 24 and finally an inner core 32.

As mentioned earlier, the present invention consists in forming the moderator structure usually of graphite which occupies the core region 12 by means of nodules which have no mechanical attachment to each other and are stacked in the core region 12 which is limited at the bottom by the reflector 4 and at the sides by the lateral reflectors 8.

Generally speaking, the shape and dimensions of the nodules result from the desired neutron moderating ratio. It is in fact readily apparent that, depending on the shape of these nodules, that fraction of the volume of the core region which is occupied by the moderator material constituting the nodules will be variable. In the case in which there is only one neutron-moderating region within the core it will clearly be preferable to employ nodules of the same type in order to fill the entire core space.

FIG. 1 shows a simple embodiment of the moderator structure corresponding to a reactor of relatively unsophisticated design. In this case, the regions 22, 24, 26 and 32 are identical or, in other words, the reactor core in fact has only one region.

The nodules are constituted by spheres which all have the same diameter. These spheres are designated by the reference 30 and will hereinafter be referred to as balls. The balls 30 are in contact in the three dimensions with the adjacent balls or with the walls of the reactor core (reflectors), with the result that a locked structure is in fact obtained. The molten salt is permitted to circulate through the interstices which remain free between the balls. It is apparent that a single moderating ratio is obtained in this case. Said balls are formed of moderator material such as graphite, for example.

Figure 2:
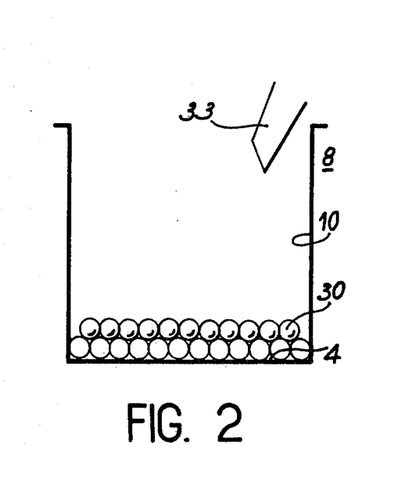
FIG. 2 is a view in elevation of a device for positioning the structure which is shown in FIG. 1.

The positioning of a structure of this type is very simple. The top shield 16 is removed. A charge chute 33 is brought into position and supplied from a ball reservoir (not shown in the drawings). The balls are thus discharged in bulk into the core region until correct filling is obtained. The shield 16 is then replaced. While the balls 30 are being discharged into the core region, the structure is briefly subjected to vibrational motion by means which have not been illustrated. There is thus obtained a pseudo-rhombohedral packing which ensures a structure without vacancies.

Figure 3:
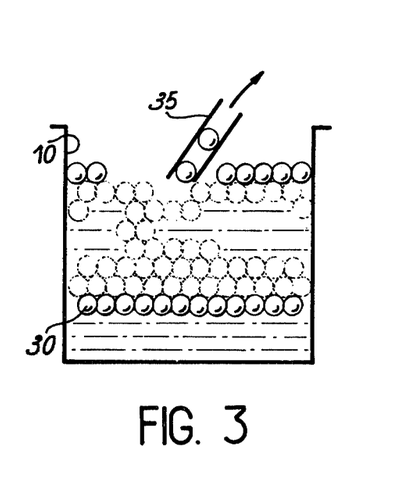
FIG. 3 is a view in elevation of a device for extracting the structure which is shown in FIG. 1.

As has already been mentioned in the foregoing, it is necessary to change the entire moderator structure periodically. This operation is particularly simple in the case of the moderator structure shown in FIG. 1. In fact, as has been illustrated in FIG. 3, it is only necessary to remove the shield 16 and then to extract the balls 30 from the core region 12 by means of a pneumatic or hydraulic sucking device 35 which need only be displaced progressively above the layers of balls. This operation can readily be performed by reason of the spherical shape of the balls.

The moderator structure described above has a number of advantages in regard to the problems of positioning and extraction. However, the structure does suffer from a disadvantage in that it permits only a single moderating ratio for the entire reactor core (ratio between the volume of salt and the volume of moderator). A further disadvantage of the structure lies in the fact that the partial flows of fuel salts cannot be adapted as a function of the specific power levels which are variable along the radius of the reactor core.

The alternative embodiment of the moderator structure which will now be described makes it possible to overcome these two disadvantages but does slightly complicate the operations involved in positioning and extraction of the moderator structure. In accordance with this alternative embodiment, the nodules are designed in the form of blocks or of prismatic volumes having a polygonal (horizontal) cross-section which can have different configurations; but in all cases, the height of these nodules represents only a small fraction of the height of the reactor core. By way of example, provision is made for eight nodules in order to obtain the full height of the reactor core. A different number could clearly be provided according to the size of the core.

Figure 4:
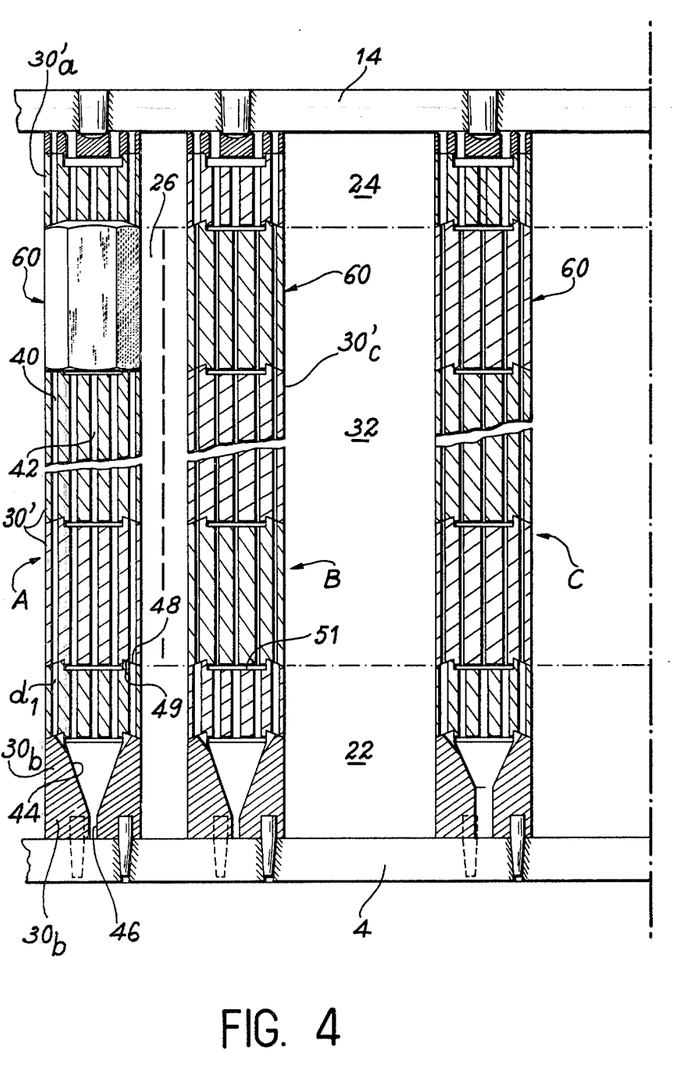
FIG. 4 is a partial view in elevation showing one embodiment of the moderator structure which is formed by means of prismatic blocks.
Figure 5:
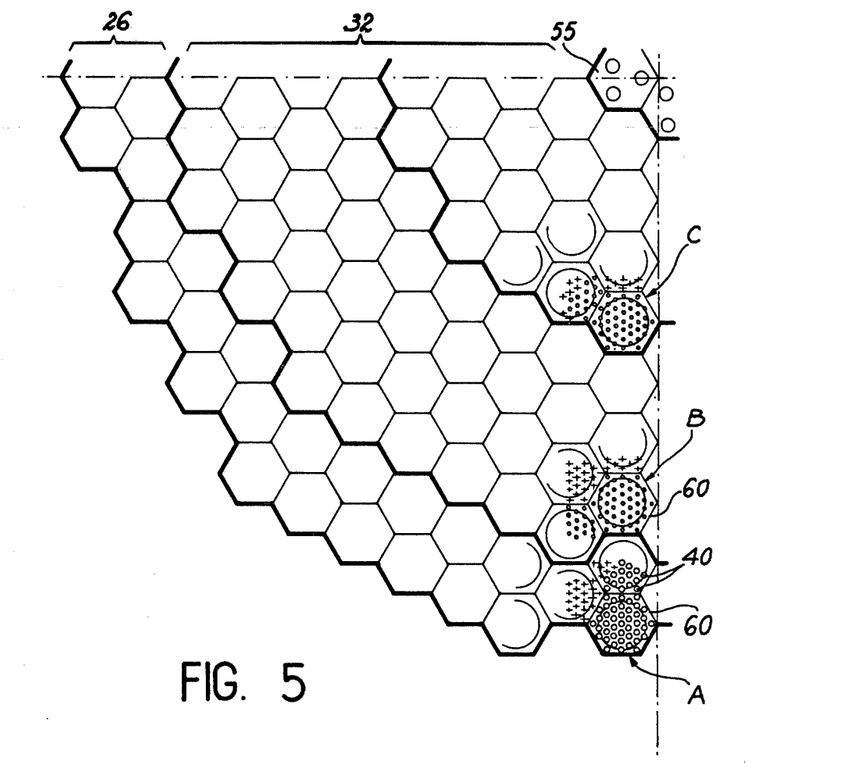
FIG. 5 is a horizontal sectional view taken along the plane V-V of FIG. 4 and showing one-quarter of the reactor core.

FIGS. 4 and 5 are views respectively in elevation and in horizontal cross-section showing a particular embodiment of the moderator structure constituted by nodules having the shape of prismatic volumes. In this particular case, each nodule (designated by the reference 30') has a hexagonal (horizontal) cross-section and is limited both at the top and at the bottom by a substantially horizontal face (the lateral faces being vertical). In the embodiment shown, the reactor core comprises the four regions 22, 24, 26 and 32 which were defined earlier. It is apparent from FIG. 4 that the nodules 30' are arranged in stacked relation in order to form moderator columns (designated by the general reference 60). Only three columns are shown in FIG. 4 in order to simplify the drawing. These columns are designated respectively as A, B and C and the column A constitutes a portion of the lateral core region 26. In order to gain a clear understanding of the invention, it should be noted that there is no keying between the nodules 30' and that each column rests only on the bottom reflector 4, for example by means of support stools.

In fact, with the exception of the top end block 30a and bottom end block 30b of each column which have a rather special shape, all the other nodules 30' (hereinafter designated as standard nodules) are designed in the form of the prismatic volume as mentioned earlier and are provided internally with vertical channels such as those designated by the reference 40. Since the channels 40 of the standard nodules of a given column are located in the line of extension of each other, it is understood that vertical passages are thus obtained up to the full height of the reactor core. Each nodule 30' comprises in particular a central channel 42, the specific function of which will be described below. The nodules constituting the bottom end blocks 30b are provided along their axis with a divergent nozzle 44, the top portion of which is joined to the complete assembly of channels 40 and 42 of the standard nodule. The bottom portion of said nozzle terminates in an axial passage 46 which has its opening at the lower end. It is apparent that, in the case of each column of the moderator structure, the molten salts penetrate through the passage 46, are distributed between the channels 42 and 40 by means of the divergent nozzle 44 and discharged at the upper end of said channels.

Although there is no keying between the different nodules of any one column, each nodule can advantageously be provided on the periphery of its end faces with conical or spherical centering portions, namely male and female centering portions designated respectively by the references 48 and 49. A small space 51 can be left between two successive nodules. Furthermore, small spacing ribs can be formed on the lateral faces of the nodules in order to leave room for a thin layer of molten salts.

It can readily be understood that this modular arrangement of the core moderator structure makes it possible to obtain on the one hand ratios of molten salt volume to moderator volume which are different according to the core regions and also makes it possible to adapt the partial flows as a function of the specific power of a given column, this specific power being variable along the radius of the reactor core.

The first result is obtained by modifying either the diameter of the number of channels. In the particular example herein described, action is produced on the diameters. The column A constitutes one of the elements of the lateral outer core 26. All the standard nodules 30' are pierced by channels 40 and 42 of "large" diameter $d_1$ which has a value of 25 mm, for example. There are forty-three channels in uniformly spaced relation (this number includes the central channel 42) and the cross-section of one nodule has the shape of a hexagon, for example, which measures 280 mm between vertices. This defines a first moderating ratio.

If consideration is given to column B or column C, it is observed that said column corresponds to the inner core 32 and to the top outer core 24 and bottom outer core 22. In the inner core region 32, the column is entirely constituted by standard nodules $30'_C$ which have the same external shape as the standard nodules 30' in which the channels 40 and 42 have a small diameter $d_2$ whilst the number of channels remains the same. For example, this diameter has a value of 15 mm. By way of example, this portion of the column is constituted by the stack of eight nodules, the height of which is equal to 490 mm.

In the case of this column, the top outer core region 24 is constituted by the top end unit 30a which has channels of diameter $d_1$ (same moderating ratio as for the lateral outer core). Similarly, the bottom outer core region 22 is formed by the bottom end unit 30b and by a standard nodule 30' having channels of diameter $d_1$.

Adjustment of the partial flows within the columns according to the position of these latter within the reactor core is obtained by adapting the diameter of the passage 46. For example, the columns A and B have passages 46 of small diameter since they take up relatively peripheral positions within the reactor core. On the contrary, the column C which occupies a more central position has a larger diameter. By way of example, these diameters can vary between 22 mm and 105 mm.

Figure 6:
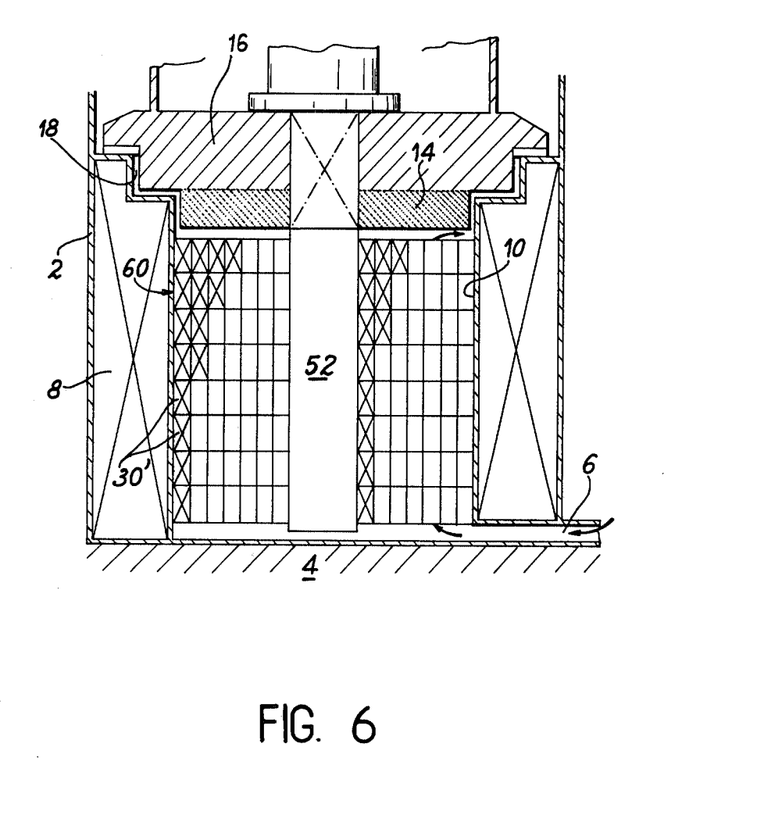
FIG. 6 is a vertical sectional view of the entire moderator structure which is shown in FIGS. 4 and 5.

There is shown in FIG. 6 the entire reactor core assembly together with its moderator structure which has already been described with reference to FIGS. 4 and 5. This figure shows that, in the central region, the reactor core has a particular structure 52 in which the reactor control rods 55 (shown in FIG. 5) are capable of moving. Said control rods are placed within graphite columns which are also composed of stacked bricks and engaged one inside the other. It is understood that these columns form an interstitial space in the moderator lattice.

The description which now follows will relate to a method for positioning within the reactor the moderator structure which has been described in the foregoing.

This form of nodules 30' cannot constitute a noninterstitial arrangement in a natural manner or even with external assistance. It is accordingly necessary to carry out methodical packing, nodule by nodule, which is industrially impracticable in a reactor which has already been in operation (operation by remote manipulation) by reason of the activity and contamination of the medium. A moderator unit of this type calls for out-ofpile assembly followed by introduction in its final form within the reactor in which it is locked radially in position by the lateral reflector. The moderator unit then rests on the bottom reflector before being applied beneath the top reflector under the action of the fuel salt.

Reference being made to FIGS. 7 to 15, there will now be described the alternative form of the method for positioning nodules which constitute the moderator structure of a molten-salt reactor. In this alternative embodiment, said nodules are constituted by prismatic blocks pierced by a central channel 42.

No distinction will be drawn between the various types of nodules employed in the design of the moderator structure since the only consideration of importance as far as the method is concerned lies in the fact that all the nodules have the same external shape and have a central channel 42.

Figures 7, 8, 9, 10:
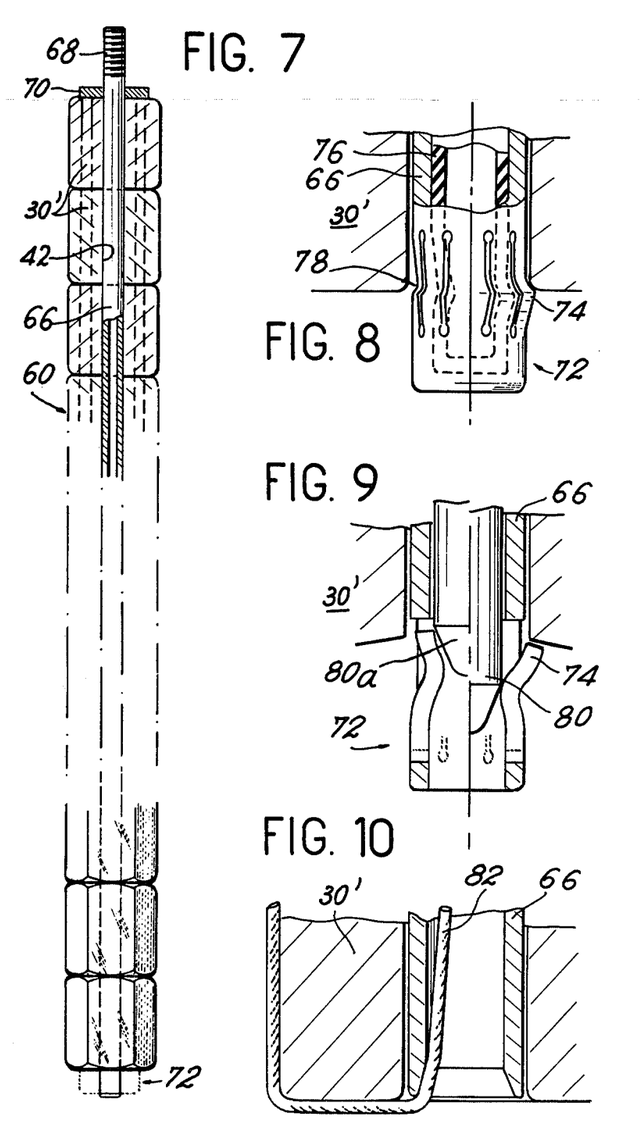
FIGS. 7 to 15 illustrate forms of construction of a device for positioning and extracting the moderator structure which is shown in FIGS. 4 to 6.

This method of positioning of nodules first consists in constructing a certain number of columns (A, B . . . ), one of which is shown in FIG. 7 and designated by the reference 60. A column of this type is made up of nodules 30' having the shape of prismatic blocks (preferably hexagonal blocks) each having a central channel 42 extending right through the block. In order to constitute a column of the type shown in FIG. 7, a certain number of nodules is engaged on a hollow rod 66 provided at the upper end with a screw-thread 68. Said nodules are thus stacked on said rod to a height equal to the height to be given to the moderator structure which constitutes the reactor core. An annular collar 70 which is also pierced by a central bore serves as a stop at the upper end for the different nodules 30' which are also locked in position at the lower end of the column by means of a temporary locking member 72. As will hereinafter become apparent, said locking member must necessarily be designed in such a manner that it can readily be disengaged when the time comes to release the different nodules.

FIGS. 8, 9 and 10 represent by way of example and not in any limiting sense three possible modes of utilization of the temporary locking member 72 which is placed at the bottom of the column 60.

Figure 13:
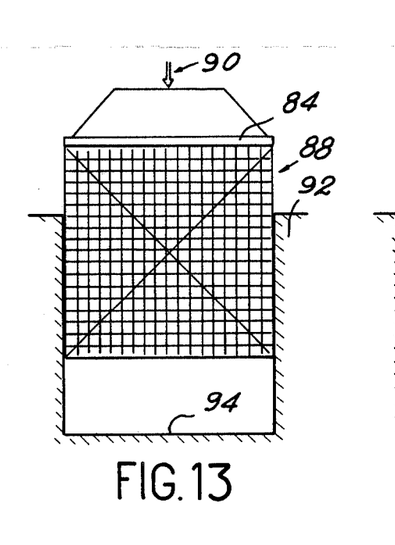

In the design solution of FIG. 13, said locking member is formed by pneumatic means. To this end, the central tube 66 has an open structure over part of its height at the level of the lowermost nodule 30' and is constituted for this purpose by a certain number of expandable axial strips 74 which are endowed with a certain degree of elasticity. The tube 66 is in any case of hollow construction and lined with a tube 76 of rubber or plastic material which need only be put under pressure from the top portion of the tube 66 in order to cause expansion of the strips 74 which then come into position so as to lock the entire column 60 at the lower end. Since they are endowed with a certain degree of elasticity, the strips 74 revert to their normal shape in a withdrawn position as shown at 78 as soon as the pressure developed within the interior of the rubber tube 76 is reduced to zero. At this moment, the complete assembly of nodules 30' is again free in translational motion around the hollow tube 66. An alternative form of locking member can be devised in a more simple manner, for example by means of a simple elastic balloon, the top portion of which is joined to the tube 26 and which, in the inflated position, accordingly constitutes a locking system for the column 60 of nodules 30'.

In the diagram of FIG. 9, the temporary locking member 72 is formed by purely mechanical means. To this end, the tube 26 is provided as in the previous form of construction by a certain number of resilient and deformable strips 74 which can be outwardly displaced at will by means of a central stud 80 which is moved downwards within the hollow tube 66, thus locking the column 60 against the tube 66 (right-hand portion of FIG. 9). On the contrary, if the stud 80 is moved upwards to position 80a (left-hand half of FIG. 9), the deformable strips 74 accordingly withdraw and make it possible to release the column 60 of nodules 30' from their tube 66.

In the alternative embodiment shown in FIG. 10, the different nodules such as 30' which are threaded onto the hollow tube 66 are maintained in position by means of a tie-wire 82 which passes through the hollow bottom portion of the tube 66 and along the external wall of all the nodules 30' which are threaded onto said tube 66 or within the tube of an adjacent column. In this case, release of the nodules 30' is obtained by releasing one of the structures from said tie-wire.

Figure 11:
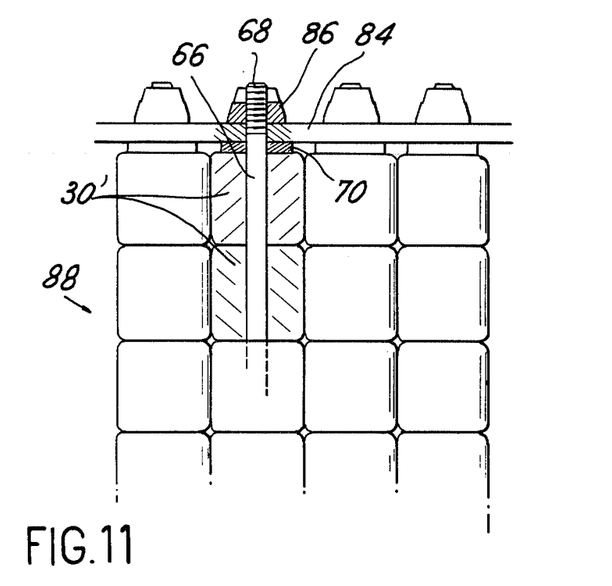
Figure 12:
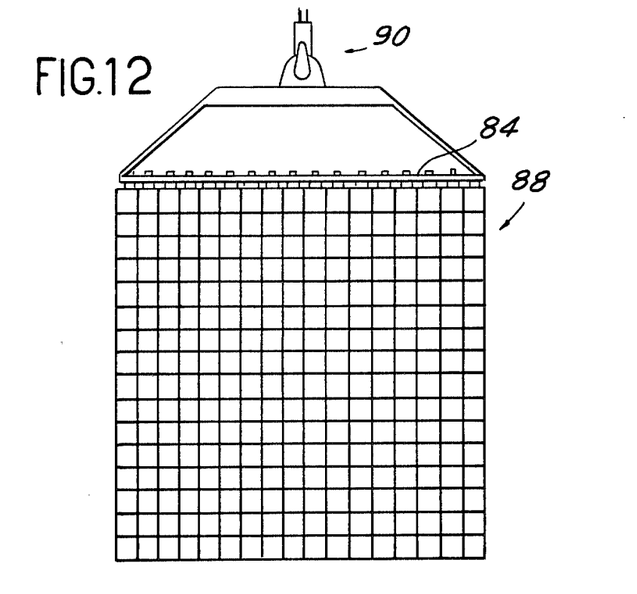

In accordance with the invention, when the number of columns 60 formed by threaded nodules is sufficient to ensure that the juxtaposed array of these latter corresponds to the moderator structure which it is desired to introduce into the reactor core, said columns are assembled outside the reactor in the manner indicated in FIG. 11. It is apparent from this figure that the different columns 60 are secured to a top plate 84 which is in turn pierced by a number of holes equal to that of the columns, each column 60 being secured to the plate, for example by means of a locking-nut 86 which is screwed onto the threaded portion 68 of each hollow tube 66. The assembly which is thus constituted is shown in FIG. 12. It is apparent from this figure that the moderator unit 88 is secured to the support plate 84 and coupled by means of this latter to a lifting device 90 of a type known per se which serves to displace the entire moderator unit 88.

Figure 14:
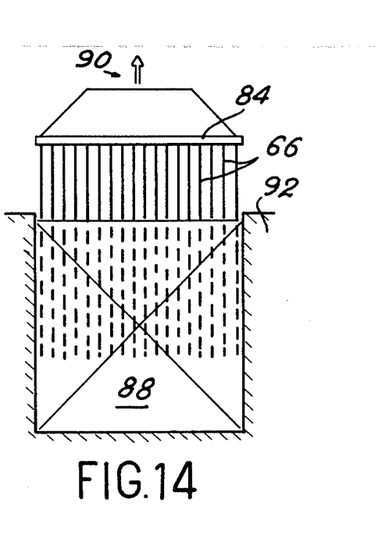
Figure 15:
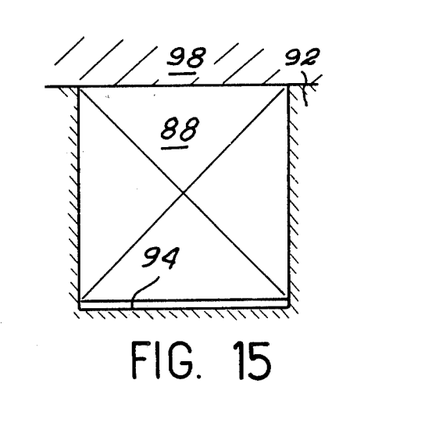

FIG. 13 shows the first stage of positioning of the moderator within the reactor core in which only the lateral reflector has been shown diagrammatically at 92. The complete moderator unit 88 which is suspended from the lifting device 90 is introduced vertically into the space provided between the lateral reflector 92 and the bottom wall 94 of the cavity formed in the bottom reflector. Once the moderator unit 88 rests on the bottom wall 94, the different columns of nodules 30' are disengaged from the tubes 66 on which they are threaded, this being achieved by slackening-off the member 72 located at the lower end of each column. It is only necessary at this point to initiate the withdrawal of the temporary supporting rig 96 constituted by the different hollow tubes 66 which are attached to the plate 84 in order to disengage said support structure from the assembly of nodules which remain in the form of a closely packed structure without vacancies and locked within the cavity of the receiving mass as illustrated in FIG. 14. In FIG. 15, the moderator unit 88 is shown in position within its reflector cavity, a top reflector 98 having been placed above the moderator unit 88. The reactor can then be brought to a critical condition by introducing the fuel salt as explained in the general FIG. 1, thereby lifting the moderator unit 88, the top portion of which is applied beneath the bottom surface of the top reflector 98.

The supporting rig which was employed for the positioning operation can again serve to withdraw the nodules 30' constituting the moderator structure, this operation being performed in the reverse order with respect to the operations shown in FIGS. 11 to 15. This withdrawal or extraction operation can be carried out on the entire moderator unit or only on a number of columns constituting the structure.

However, it may be found impossible to insert the tubes 66 of the supporting rig into the aligned assemblies of central channels 12 of the nodules 30'. This may be due to a fractured condition of the columns 60, for example, or to any other causes. The method of extraction described in the foregoing would in such a case be inapplicable. There will accordingly be formed a vacancy in the moderator lattice at the level of the particular structure 52 in which the reactor control rods are housed. The stacks of moderator bricks which constitute this region 52 are removed. This operation is performed by locking the control rods to the lower end of the stacks, for example when said rods are in the bottom position. By lifting the control rods, the particular structure 52 constituted by the columns 55 is also lifted at the same time. A localized vacancy is thus formed in the moderator lattice and the nodules 30' are consequently no longer locked in position. This results in collapse of the moderator nodules from one column to the next.

Figure 16:
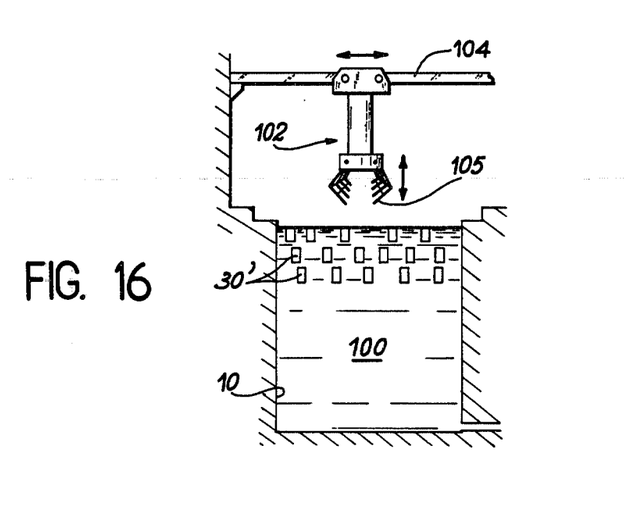
FIG. 16 is a view in elevation of a device for extracting the moderator structure of FIG. 6.

Referring now to FIG. 16, a method of extraction of "unjammed" nodules 30' will now be described.

This operation is carried out during reactor shutdown, circulation of the molten fuel salt having been interrupted and this latter being discharged into storage tanks. After withdrawal of the biological shield 16 and the particular structure 52 which is associated therewith and serves to house the control devices, a liquid 100 having a higher density than that of the material constituting the nodules is fed into the cavity 10 of the reactor in such a manner as to ensure that the structure is completely immersed in said liquid.

When the nodules are formed of graphite, it is an advantage to employ molten lead.

Under these conditions, the nodules can float on the liquid and the moderator structure which was initially in a perfectly ordered array consequently becomes disordered as a result of relative displacement of the nodules forming the structure, this being in turn brought about by withdrawal of the central column which forms a vacant space within this stack.

In consequence, the nodules 30' are no longer in contact with each other and can be extracted from the reactor cavity 10 by means of a handling device 102 which is capable of displacement above the reactor cavity, for example by means of an overhead traveling bridge 104, and which can be moved downwards within the interior of the liquid medium 100 so as to grip the nodules 30' which are floating at the surface of said liquid. Said handling device 100 is constituted in this example by jaws 105 of the claw type. It is possible, however, to contemplate the use of other devices provided that they are capable of gripping solid bodies in a liquid medium without loading the liquid at the same time such as, for example, the use of a perforated basket.

When all the nodules 30' have been unloaded from the reactor cavity, draining of the liquid contained within said cavity is then carried out so as to ensure that this latter is again in readiness to receive a fresh moderator structure.

This method of extraction of the moderator structure does not imply any limitation in either transverse or longitudinal dimensions of the nodules. The method is even more advantageous in the case of nodules of large size since it calls for a lesser degree of precision in handling operations and equipment while permitting at the same time more rapid unloading of the entire structure.

By means of this method it is not necessary to ensure that the height of the nodules is close to the transverse dimensions as was the case for the extraction of nodules by pneumatic or hydraulic transfer means.

This method is therefore well suited to relatively flat nodules or on the contrary to nodules of relatively substantial height with respect to their cross-section.

Figure 17:
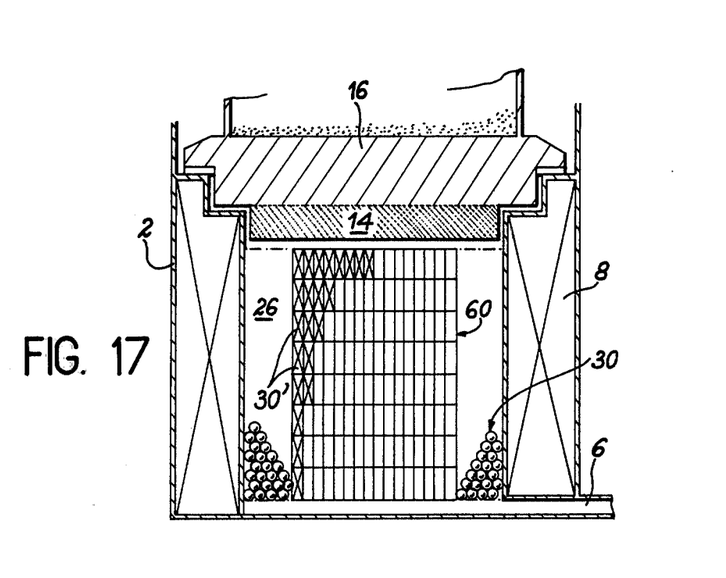
FIG. 17 is a vertical sectional view of a third embodiment of the moderator structure.

FIG. 17 shows a third embodiment of the moderator structure which in fact combines the spherical nodules with nodules in the form of prismatic blocks. The inner reactor core is formed by stacks of prismatic nodules 30' and the lateral outer core 26 is formed by spherical nodules 30.

In this case, the inner core 32 (and the top and bottom cores 24 and 22) is formed by columns 60 of prismatic nodules which are identical with the columns B or C of FIG. 4. The lateral outer core 26 is formed by a rhombohedral stack of spherical nodules 30. These spheres or balls are pressed vertically against the top reflector 14 by hydrostatic action as well as the action resulting from the flow of salt so as to produce a centripetal action on the columns 66 of prismatic blocks 30'. Since the result achieved is to permit "breathing" of the reactor core, this arrangement must permit expansion of the graphite beyond initial dimensions and therefore have the effect of extending the residence time in the reactor.

What we claim is:

1. A method for positioning and extracting a moderator structure made of separate spherical moderator elements and also nodules in and from a nuclear reactor of the molten salt type, said method comprising positioning operations and extracting operations, wherein the positioning operations include the steps of:
    (a) defining a core region of the nuclear reactor by a bottom wall and a lateral reflector,
    (b) feeding in bulk a quantity of said spherical nodules required for completely filing said core region and obtaining said moderator structure consisting in a stock of separate nodules applied in mutual contact in the three dimensions of the space and a lattice of interstices in said stock,
    (c) placing a top wall for closing said core region, and
    (d) introducing into said core region, said molten salt, the extracting operations including the steps of:
    (e) removing the top wall, and
    (f) extracting said nodules by way of a handling device.

2. A method according to claim 1, wherein the positioning operations include the step of subjecting the moderator structure to vibration after the step (b).

3. A method for positioning and extracting a moderator structure made of separate spherical moderator elements and also nodules in and from a nuclear reactor of the molten salt type, said method comprising positioning operations and extracting operations, wherein the positioning operations include the steps of;
    (a) defining a core region of the nuclear reactor by a bottom wall and a lateral reflector,
    (b) feeding in bulk a quantity of said spherical nodules required for completely filing said core region and obtaining said moderator structure consisting in a stock of separate nodules applied in mutual contact in the three dimensions of the space and a lattice of interstices in said stock, (c) placing a top wall for closing said core region, and
(d) introducing into said core region, said molten salt, the extracting operations including the steps of:
(e) Removing the top wall, and
(f) extracting said nodules by way of a handling device wherein the step f consists in withdrawing the molten salt and in introducing within said core region a liquid having a higher density than that of the constituent material of the nodules in order to cause said nodules to float on said liquid and wherein said nodules are extracted from said liquid by means of a handling device designed to grip only the nodules aforesaid.

4. A method according to claim 3, wherein said nodules are of graphite and the liquid is molten lead.

5. A method according to claim 1, wherein said handling device consists in hydraulic and also pneumatic transfer means.

6. A method according to claim 1, wherein said handling device consists in jaws of the claw type.

7. A method for positioning and extracting a moderator structure made of separate prismatic shaped moderator blocks in or from a nuclear reactor of the molten salt type, said method comprising positioning operations and extracting operations wherein: the positioning operations include the steps of:
(a) defining a core region of the nuclear reactor by a bottom wall and a lateral reflector,
(b) assembling the moderator blocks on a temporary supporting rig so as to define said moderator structure, outside said core region and introducing said assembled structure into said core region and disassembling said blocks from said supporting rib, and extracting said supporting rig,
(c) placing a top wall for closing said core region,
(d) and introducing into said core region said molten salt, the extracting operations including the steps of:
(e) removing the top wall, and
(f) extracting said nodules by way of a handling device.

8. A method according to claim 7 wherein the step f of the method is carried out by the supporting rig itself.

9. A method according to claim 7 for positioning and extracting a moderator structure made of moderator blocks, each block being provided with a central channel wherein the supporting rig is constituted by a series of hollow rods on which are threaded the central channels of a plurality of blocks, said hollow rods being rigidly fixed to a top support plate and the blocks being locked in position on the corresponding hollow rod by means of a temporary locking member located at the bottom of said rods.

10. A method according to claim 9, wherein the temporary locking members are pneumatic.

11. A method according to claim 9, wherein the temporary locking members are mechanical.

12. A method according to claim 9, wherein the temporary locking member is a tie-wire which is passed through the hollow rod and closed in a loop against the external surface of said blocks or engaged within an adjacent hollow rod.

13. A method according to claim 7, wherein the step f consists in withdrawing the molten salt, and in introducing within said core region a liquid having a higher density than that of the constituent material of the nodules in order to cause said nodules to float on said liquid and wherein said nodules are extracted from said liquid by means of a handling device designed to grip only the nodules aforesaid.

14. A method according to claim 13, wherein the blocks are made of graphite and the liquid is molten lead.

15. A method according to claim 7, wherein the handling device consists in jaws of the claw type.

16. A method according to claim 3, wherein the positioning operations include the step of subjecting the moderator structure to vibration after the step (b).

* * * * *